Oct. 18, 1938.  C. F. BARRETT  2,133,884
FISHING LURE
Filed May 13, 1937

Inventor
C. F. Barrett
By L. F. Randolph
Attorney

Patented Oct. 18, 1938

2,133,884

UNITED STATES PATENT OFFICE 2,133,884

FISHING LURE

Conrad F. Barrett, Anthony, N. Mex.

Application May 13, 1937, Serial No. 142,484

6 Claims. (Cl. 43—34)

This invention relates to improvements in fishing lures.

The object of the invention is to provide a transparent container adapted to contain a bait, and a hook held by a trigger mechanism and adapted to be released by a fish attempting to grab the bait.

Other objects and advantages of the invention will become apparent from the following specification of which the drawing forms a part, and wherein:—

Figure 5:
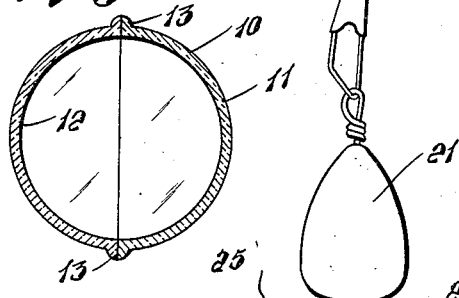
Figure 5 is a cross sectional view on the line 5—5 of Figure 1.
Figure 3:
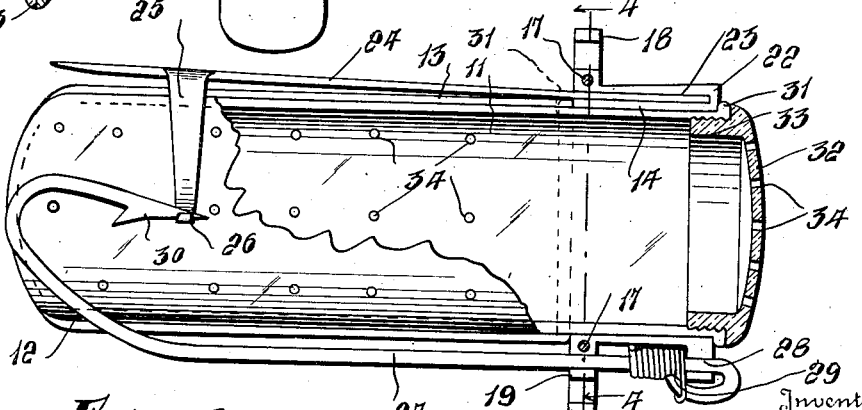
Figure 3 is an enlarged side elevational view partly in section of the same.

Referring more particularly to the drawing wherein like reference characters designate like or corresponding parts in the different views, a container 10, preferably formed of Celluloid or other transparent material, and comprising corresponding sections 11 and 12 is provided with corresponding ribs 13 at the top and bottom thereof to strengthen container 10, as best seen in Figure 5.

A band 14 comprising sections 15 and 16 is adapted to be secured to container 10 by screws 17 engaging threaded openings in the eye members 18 and 19. Eye member 18 is adapted to secure the device 10 to the line 20 and eye member 19 is connected by any suitable means to a sinker 21.

Band 14 is provided with an enlarged portion 22 which contains a recess 23 which extends through the member 18.

One end of a leaf type spring 24 is adapted to be mounted in recess 23. A trigger 25, formed integral with spring 24, extends outwardly and downwardly therefrom and is provided with a hooked end 26.

A hook 27 has its shank journaled in member 19 and in an eyelet 28 formed on band 14. A coil spring 29 is mounted on hook 27 to urge the barbed end 30 outwardly from container 10 to the position shown in Figure 1.

Container 10 is provided with shoulders 31 adapted to hold band 14 in position. A cap 32 provided with an annular externally threaded flange 33 is adapted to engage and close the internally threaded open end of container 10. Container 10 and cap 32 are provided with apertures 34 to permit water to pass through the container 10 to keep the bait contained therein alive and/or to carry off the smell of the bait to attract the fish to the lure.

Figure 1:
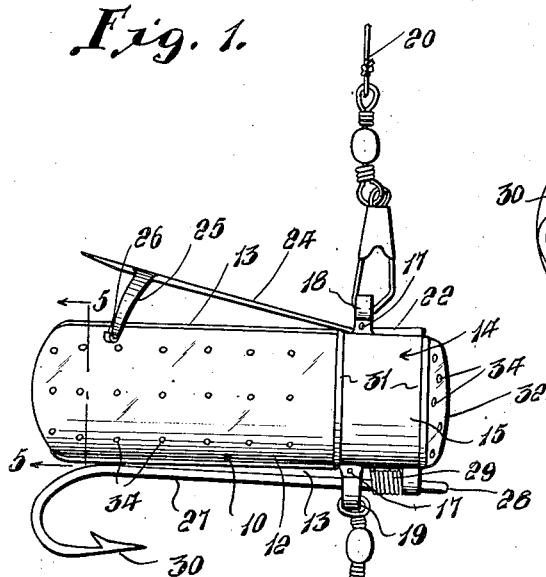
Figure 1 is a side elevational view of the lure, showing the hook in a released position.
Figure 2:
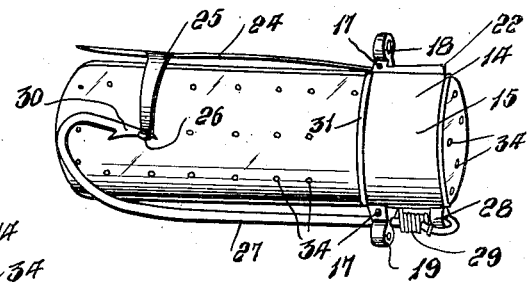
Figure 2 is a view similar to Figure 1 showing the hook held by the trigger in a set position.
Figure 4:
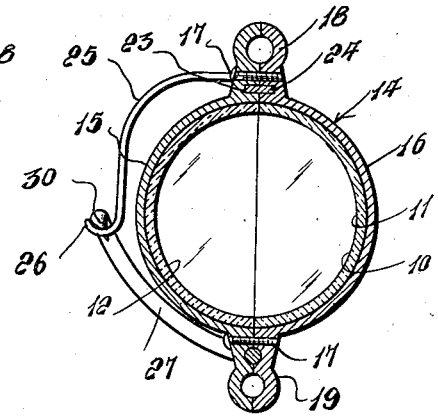
Figure 4 is a cross sectional view on the line 4—4 of Figure 3.

To set the device for use, the bait is placed in container 10 and cap 32 is applied. Spring 24 is pressed downwardly from its normal position as seen in Figure 1, and hook 27 is revolved against the pressure of spring 29 until the barbed end 30 engages hook 26 of trigger 25. Springs 24 and 29 are held compressed by the engagement of parts 26 and 30. When a fish grabs at the bait he will press spring 24 downwardly releasing barbed end 30 from trigger 25. Spring 29 will revolve hook 27, swinging barbed end 30 outwardly to hook the fish.

It is to be understood that only the preferred embodiment of the invention has been shown, the right being reserved to make such changes and modifications as will not depart from the spirit and scope of the invention.

I claim as my invention:—

1. A fish lure comprising a bait holder, a band mounted upon said bait holder, a spring actuated hook rotatably mounted in said band, and a spring actuated trigger mounted in said band and adapted to releasably engage said hook.

2. A fishing lure comprising a transparent bait holder, a band mounted on said holder, a spring actuated hook rotatably mounted in said band, and a resilient trigger member adapted to releasably engage said hook.

3. A fishing lure comprising a transparent bait holder, a band mounted thereon adjacent one end thereof, a resilient trigger secured to said band and extending lengthwise of said holder, a hook extending outwardly from said trigger and bent to extend around a portion of said holder, a fish hook having its shaft journaled in said band, the barb of said hook being held by the trigger hook when said trigger is in a compressed position, and a spring carried by the fish hook to swing it outwardly and downwardly when released by said trigger hook.

4. A fish lure comprising a transparent body provided with spaced ribs adjacent one end, a band mounted between said ribs and provided with a plurality of eyelets adapted to attach a line and sinker to the lure, a resilient trigger extending lengthwise of said body and having one end mounted in said band, a fish hook rotatably mounted in said band and positioned to allow its barb to releasably engage said trigger, and means attached to said hook to swing it outwardly when disengaged by said trigger.

5. A fish lure comprising a transparent live bait container formed of corresponding sections open at one end, a cap to removably engage said end, ribs formed in spaced relationship on said container adjacent said open end, clamping members comprising corresponding sections adapted to removably engage said container between said ribs to form a band, a fish hook rotatably mounted in said band, a resilient trigger mounted to engage said hook when in an inoperative position, and means to urge said hook outwardly when released by said trigger.

6. A fish lure comprising a body portion formed of corresponding sections, a band formed of corresponding sections to hold said body portion in assembled position, a fish hook rotatably mounted in said band, spring means normally urging the barbed end of said hook outwardly, and a resilient trigger mounted in said band and positioned to engage the barb of said hook when partially compressed to releasably hold said hook in an inoperative position.

CONRAD F. BARRETT.